United States Patent
Meyer

(10) Patent No.: US 10,494,202 B2
(45) Date of Patent: Dec. 3, 2019

(54) GAS LIFTING ASSEMBLY

(71) Applicant: James Meyer, Elkart Lake, WI (US)

(72) Inventor: James Meyer, Elkart Lake, WI (US)

( * ) Notice: Subject to any disclaimer, the term of this patent is extended or adjusted under 35 U.S.C. 154(b) by 65 days.

(21) Appl. No.: 15/710,937

(22) Filed: Sep. 21, 2017

(65) Prior Publication Data

US 2019/0084782 A1 Mar. 21, 2019

(51) Int. Cl.
*B65G 65/23* (2006.01)
*B65G 65/24* (2006.01)
*B60P 1/34* (2006.01)

(52) U.S. Cl.
CPC ............ *B65G 65/23* (2013.01); *B65G 65/24* (2013.01); *B60P 1/34* (2013.01)

(58) Field of Classification Search
CPC .... B66F 9/19; B66F 9/07; B66F 9/072; B66F 9/187; B66F 7/02; B66F 7/22; B65G 65/23; B65G 65/24; B65G 37/02; B65F 3/046; B66C 3/005; B60P 1/14; B60P 1/34
USPC ......... 414/420, 422, 425, 651, 639; 187/235
See application file for complete search history.

(56) References Cited

U.S. PATENT DOCUMENTS

| | | | |
|---|---|---|---|
| 1,910,364 A * | 5/1933 | Remde | B66F 9/08 187/226 |
| 2,569,053 A * | 9/1951 | Healy | B66F 9/08 180/215 |
| 3,868,033 A | 2/1975 | Le Duff | |
| 4,015,686 A * | 4/1977 | Bushnell, Jr. | B66F 11/04 182/112 |
| 4,797,050 A | 1/1989 | Habicht | |
| 5,207,550 A | 5/1993 | Lehman | |
| 5,393,190 A | 2/1995 | Vickary | |
| 5,401,134 A * | 3/1995 | Habicht | B66F 9/06 187/227 |
| 5,406,996 A * | 4/1995 | Wagner | B66F 9/06 141/364 |
| 5,425,614 A * | 6/1995 | Perussi | B66C 23/48 141/351 |
| 5,674,042 A | 10/1997 | Gerritse | |
| 8,011,622 B1 | 9/2011 | Guthrie | |
| 8,550,475 B2 * | 10/2013 | Chauza | B62B 1/16 280/47.19 |
| 9,198,834 B2 * | 12/2015 | Solvell | A61J 7/0076 |
| D752,838 S | 3/2016 | Ziaylek et al. | |
| 2006/0124807 A1 * | 6/2006 | Nice | B67D 7/845 248/140 |

FOREIGN PATENT DOCUMENTS

WO WO2013186446 12/2013

* cited by examiner

*Primary Examiner* — Glenn F Myers

(57) ABSTRACT

A gas can lifting assembly for lifting and tilting a gas can includes a cart that may be rolled along the support surface. A lift is coupled to the cart and the lift is selectively manipulated. A basket is pivotally coupled to the lift such that the lift selectively lifts and lowers the basket. A gas can is selectively positioned in the basket. In this way the gas can may be selectively lifted and lowered for refueling a machine. The basket is selectively positioned in a first position having the basket being horizontally oriented. Additionally, the basket is selectively positioned in a second position having the basket being tilted to pour gasoline from the gas can.

8 Claims, 5 Drawing Sheets

GAS LIFTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention.
(2) Description of Related Art Including Information Disclosed Under 37 CFR 1.97 and 1.98.

The disclosure and prior art relates to lifting devices and more particularly pertains to a new lifting device for lifting and tilting a gas can.

BRIEF SUMMARY OF THE INVENTION

An embodiment of the disclosure meets the needs presented above by generally comprising a cart that may be rolled along the support surface. A lift is coupled to the cart and the lift is selectively manipulated. A basket is pivotally coupled to the lift such that the lift selectively lifts and lowers the basket. A gas can is selectively positioned in the basket. In this way the gas can may be selectively lifted and lowered for refueling a machine. The basket is selectively positioned in a first position having the basket being horizontally oriented. Additionally, the basket is selectively positioned in a second position having the basket being tilted to pour gasoline from the gas can.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
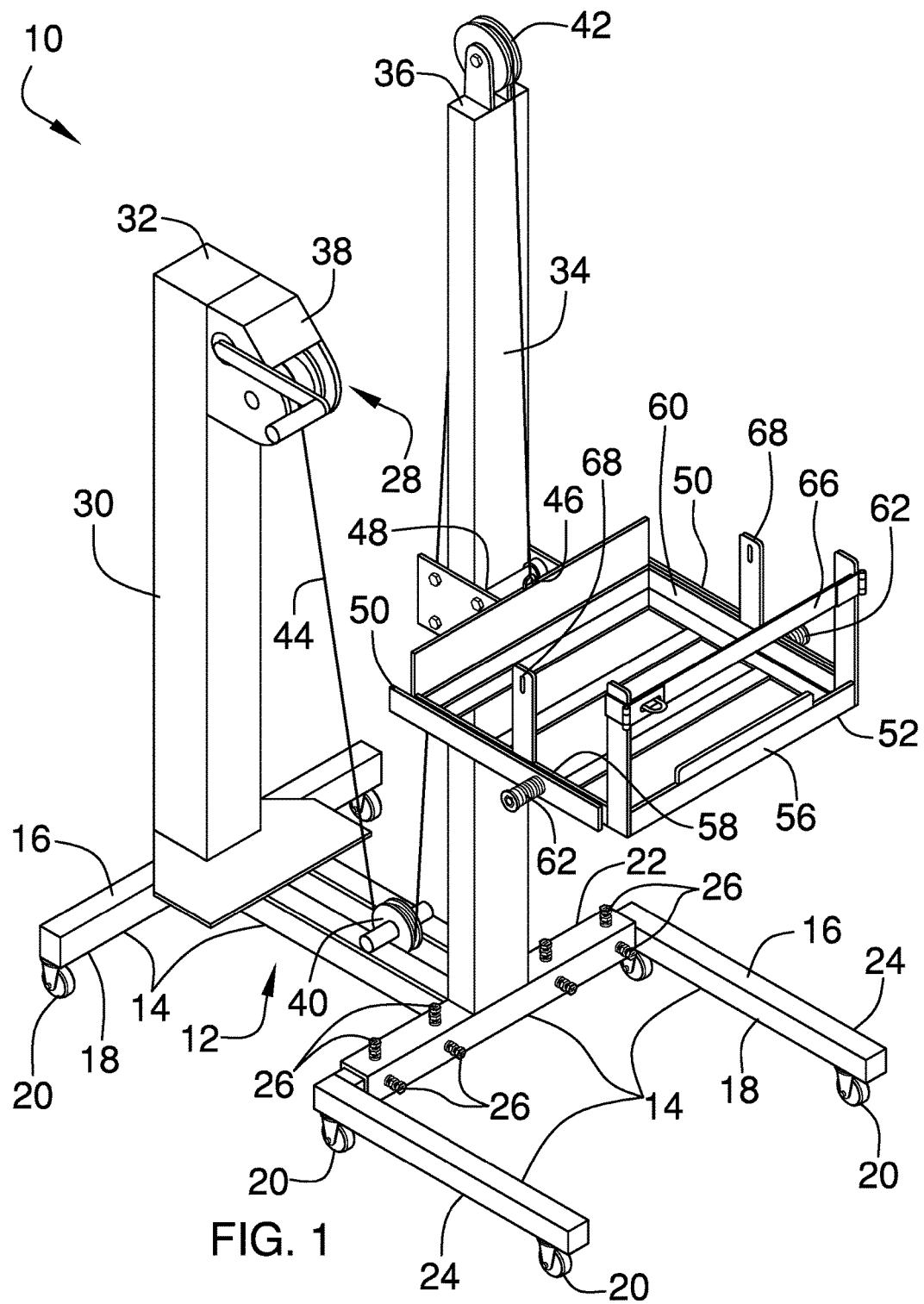
FIG. 1 is a top perspective view of a gas can lifting assembly according to an embodiment of the disclosure.
Figure 2:
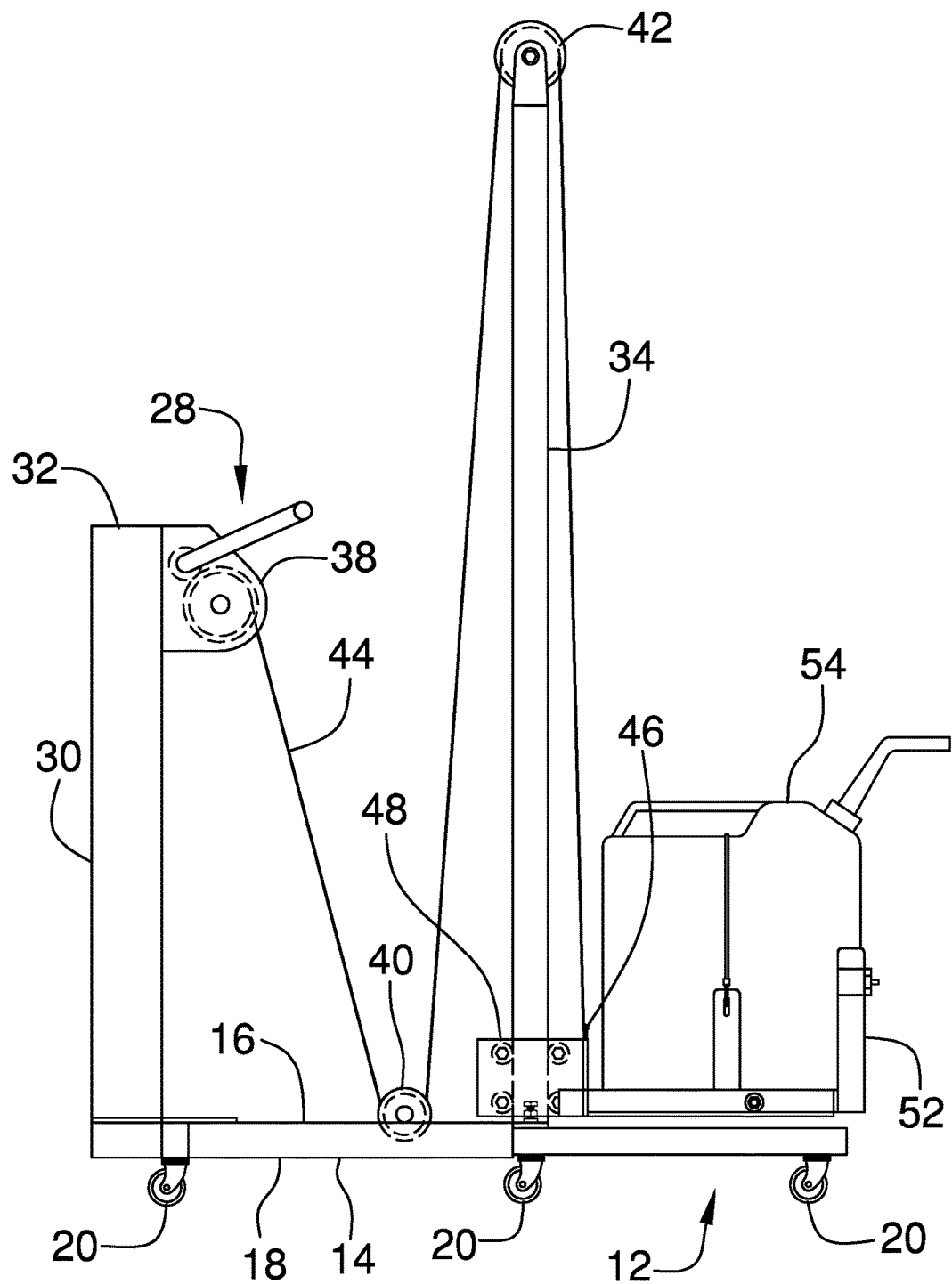
FIG. 2 is a right side view of an embodiment of the disclosure showing a lift in a lowered position
Figure 3:
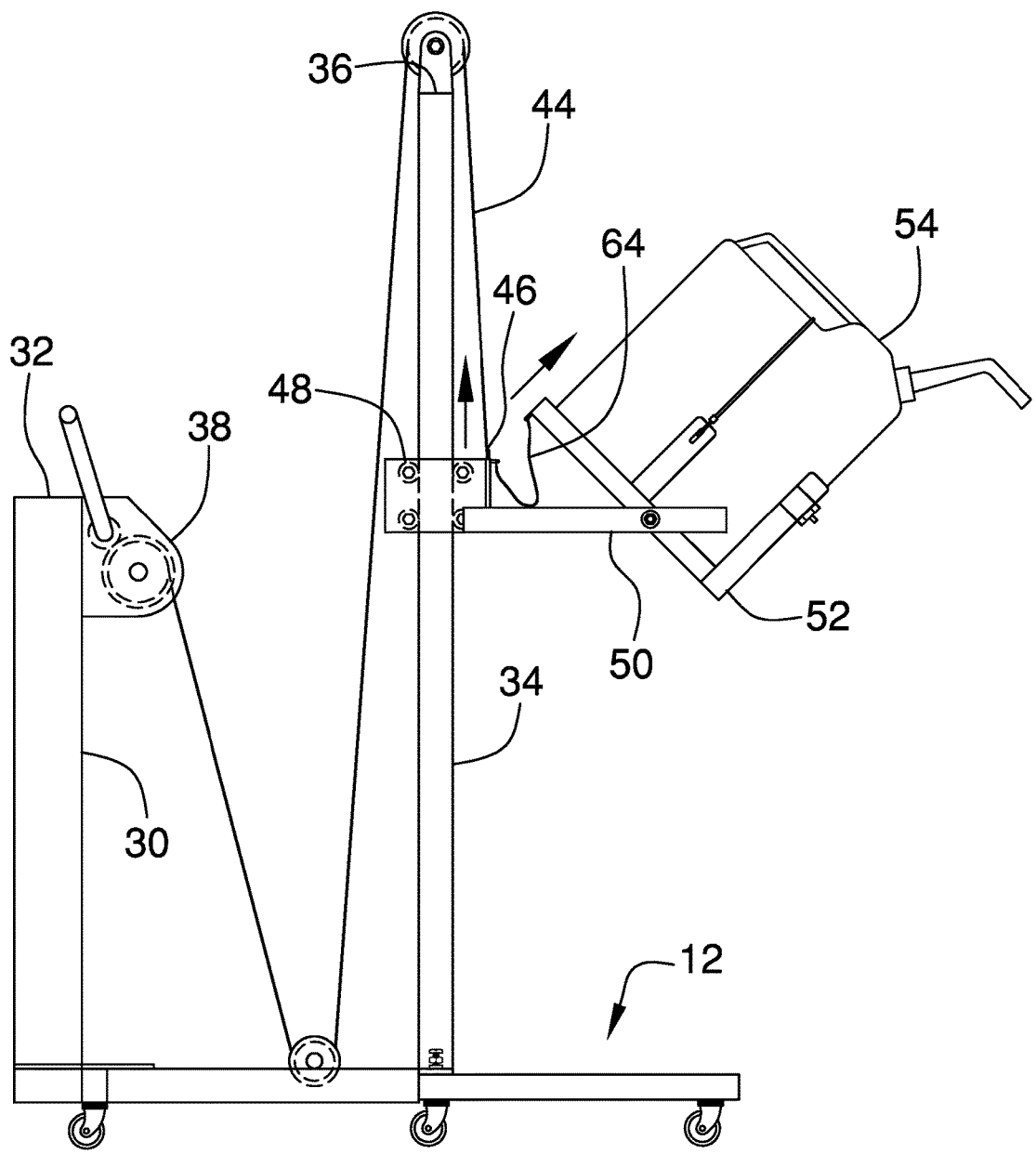
FIG. 3 is a right side view of an embodiment of the disclosure showing a lift in a lifted position.
Figure 4:
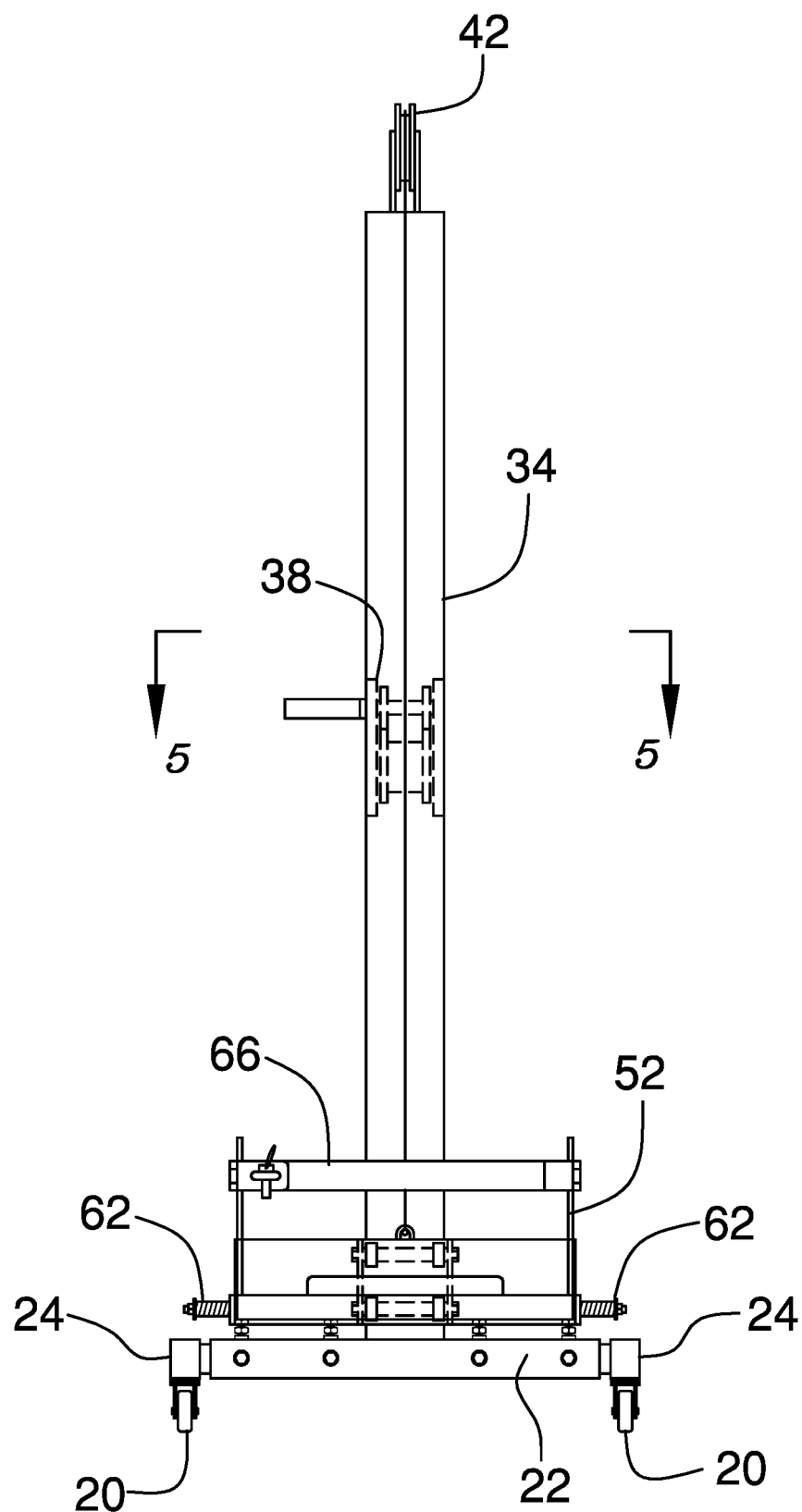
FIG. 4 is a front view of an embodiment of the disclosure.
Figure 5:
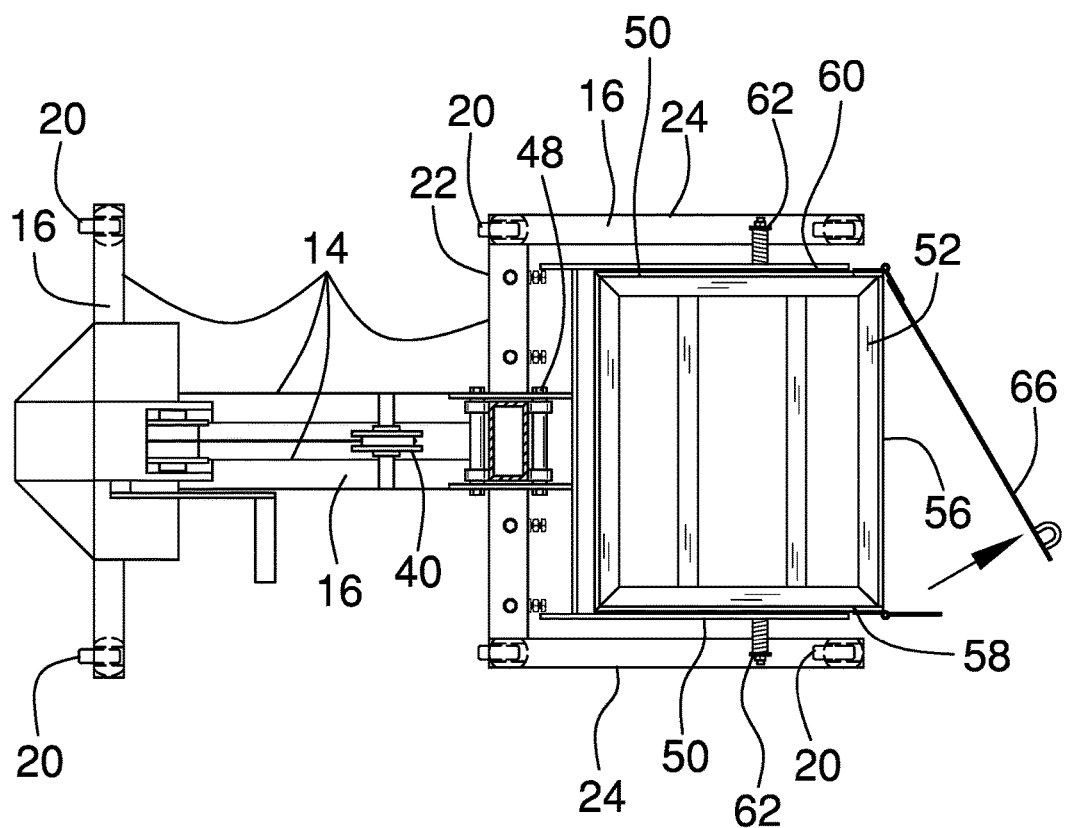
FIG. 5 is a top view of an embodiment of the disclosure.

With reference now to the drawings, and in particular to FIGS. 1 through 5 thereof, a new lifting device embodying the principles and concepts of an embodiment of the disclosure and generally designated by the reference numeral 10 will be described.

As best illustrated in FIGS. 1 through 5, the gas can lifting assembly 10 generally comprises a cart 12 that may be rolled along the support surface. The cart 12 comprises a plurality of intersecting members 14 and each of the intersecting members 14 has a top side 16 and bottom side 18. A plurality of wheels 20 is provided and each of the wheels 20 is rotatably coupled to the cart 12 to roll along support surface. Each of the wheels 20 is positioned on the bottom side 18 of a corresponding one of the intersecting members 14.

The plurality of intersecting members 14 may include a front member 22 and a pair of outward members 24. Each of the outward members 24 may be slidably coupled to the front member 22 and the outward members 24 may be oriented perpendicular to the front member 22. Moreover, the pair of outward members 24 may be spaced a selected distance apart from each other. A plurality of fasteners 26 may be provided and each of the fasteners 26 may be movably coupled to the front member 22. Each of the fasteners 26 may be selectively tightened to frictionally engage an associated one of the outward members 24 to retain the associated outward members 24 at a selected spacing.

A lift 28 is coupled to the cart 12 and the lift 28 is selectively manipulated between a lifted position and a lowered position. The lift 28 comprises a first tower 30 that is coupled to and extends upwardly from the top side 16 of an associated one of the intersecting members 14. The first tower 30 has a distal end 32 with respect to the top side 16. The lift 28 includes a second tower 34 that is coupled to and extends upwardly from the top side 16 of an associated one of the intersecting members 14. The second tower 34 has a distal end 36 with respect to the top side 16 and the first tower 30 is spaced from the second tower 34.

A winch 38 is coupled to the first tower 30 and the winch 38 is selectively rotated. The winch 38 may be a hand cranked winch 38 or the like. A first pulley 40 is rotatably coupled to the cart 12 and the first pulley 40 is positioned between the first 30 and second 34 towers. A second pulley 42 is rotatably coupled to the second tower 34 and the second pulley 42 is positioned on the distal end 36 of the second tower 34.

A cable 44 is coupled around the winch 38 and the cable 44 extends through each of the first and second pulley 42s. The cable 44 has a distal end 46 with respect to the winch 38. The distal end 46 of the cable 44 is selectively urged upwardly and downwardly along the second tower 34 when the winch 38 is manipulated. The cable 44 may be a steel cable or the like and the cable 44 may have a weight capacity of approximately 100.0 kg.

A roller 48 is slidably coupled to the second tower 34. The distal end 46 of the cable 44 is coupled to the roller 48. In this way the roller 48 is selectively raised and lowered along the second tower 34 when the winch 38 is manipulated. The roller 48 may include a plurality of cylinders that each roll along the second tower 34. Additionally, the roller 48 may be a mechanical roller of any conventional design that is rollably coupled to the second tower 34.

A pair of arms 50 is provided and each of the arms 50 is coupled to and extends away from the roller 48. The arms 50 are spaced apart from each other and each of the arms 50 is horizontally oriented. A basket 52 is provided and the basket 52 is pivotally coupled to the lift 28 such that the lift 28 selectively lifts and lowers the basket 52. A gas can 54, and any other object, is selectively positioned in the basket 52. In this way the gas can 54 may be selectively lifted and lowered for refueling a machine of the like. The lift 28 facilitates an individual to lift the gas can 54 who would otherwise not be strong enough to lift 28 the gas can 54.

The basket 52 is selectively positioned in a first position having the basket 52 being horizontally oriented. In this way the basket 52 carries the gas can 54 upwardly and downwardly on the lift 28. The basket 52 is selectively positioned in a second position having the basket 52 being tilted downwardly. In this way the basket 52 facilitates gasoline to be poured from the gas can 54.

The basket 52 has a front side 56, a first lateral side 58 and a second lateral side 60. A pair of biasing members 62 is provided and each of the biasing members 62 is coupled between an associated one of the arms 50 of the lift 28 and an associated one of the first 58 and second 60 lateral sides of the basket 52. Each of the biasing members 62 urges the basket 52 between the first and second positions. In this way the biasing members 62 assist the individual with tipping the gas can 54 to pour the gasoline. A cord 64 is coupled between the basket 52 and the roller 48 to retain the basket 52 at a selected angle when the basket 52 is in the second position.

A latch 66 is hingedly coupled to the basket 52 to retain the gas can 54 on the basket 52. The latch 66 is positioned on the front side 56 of the basket 52. The latch 66 is selectively positioned between an open position and a closed position. The latch 66 may include a bar that is hingedly coupled between the first 58 and second 60 lateral sides of the basket 52 or the like. A pair of brackets 68 may be provided and each of the brackets 68 may extend upwardly from an associated one of the first and second lateral side 60s of the basket 52. A bungee cord or the like may be extended over the gas can 54 and be removably coupled to each of the brackets 68 to retain the gas can 54 in the basket 52.

In use, the winch 38 is manipulated to lower the basket 52 to the ground. The latch 66 is opened and the gas can 54 is positioned in the basket 52. The latch 66 is closed and the gas can 54 is secured to the basket 52 with the bungee cord or the like. The winch 38 is manipulated to lift 28 the gas can 54 to a selected height. In this way the gas can 54 is positioned to pour the gasoline downwardly into the machine, such as a riding lawn mower or other gasoline powered machine. The cart 12 is rolled along the support surface to align the gas can 54 with a fuel spout on the machine. The basket 52 is urged into the second position to pour the gasoline out of the gas can 54 and into the fuel spout. In this way a single individual, such as an elderly person or a physically disabled person, may lift 28 and tilt the gas can 54 for refueling the machine.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gas can lifting assembly being configured to selectively lift a gas can thereby facilitating the gas can to re-fuel a machine, set assembly comprising:
   a cart being configured to be rolled along a support surface;
   a lift being coupled to said cart wherein said lift is configured to be manipulated, said lift comprising
      a first tower being coupled to and extending upwardly from said cart, said first tower having a distal end with respect to said cart,
      a second tower being coupled to and extending upwardly from said cart, said second tower having a distal end with respect to said cart, said first tower being spaced from said second tower,
      a winch being coupled to said first tower, said winch being vertically spaced above said cart,
      a first pulley being rotatably coupled to said cart, said first pulley being positioned between said first and second towers,
      a second pulley being rotatably coupled to said second tower, said second pulley being positioned on said distal end of said second tower, and
      a cable being coupled around said winch, said cable extending through each of said first and second pulleys, said cable having a distal end with respect to said winch, said distal end being selectively urged upwardly and downwardly along said second tower when said winch is manipulated; and
   a basket being slidably coupled to said second tower, said basket being coupled to said distal end of said cable such that said lift selectively lifts and lowers said basket, said basket being configured to have a gas can positioned therein thereby facilitating the gas can be selectively lifted and lowered for refueling a machine, said basket being pivotable relative to said lift wherein said cart is selectively positionable in a first position having said basket being horizontally oriented, said basket being selectively positionable in a second position having said basket being tilted wherein said basket is configured to pour gasoline from the gas can.

2. The assembly according to claim 1, wherein said cart comprises a plurality of intersecting members, each of said intersecting members having a top side and bottom side.

3. The assembly according to claim 2, further comprising a plurality of wheels, each of said wheels being rotatably coupled to said cart wherein each of said wheels is configured to roll along support surface, each of said wheels being positioned on said bottom side of a corresponding one of said intersecting members.

4. The assembly according to claim 1, said lift further comprising a roller being slidably coupled to said second tower, said distal end of said cable being coupled to said roller such that said roller is selectively raised and lowered along said second tower when said winch is manipulated.

5. The assembly according to claim 4, said lift further comprising a pair of arms, each of said arms being coupled to and extending away from said roller, said arms being spaced apart from each other, each of said arms being horizontally oriented.

6. The assembly according to claim 5, further comprising a pair of biasing members, each of said biasing members being coupled between an associated one of said arms of said lift and an associated one of a first lateral side and a second lateral side of said basket, each of said biasing members urging said basket between said first and second positions.

7. The assembly according to claim 1, further comprising a latch being hingedly coupled to said basket wherein said latch is configured to retain the gas can on said basket, said latch being positioned on a front side of said basket.

8. A gas can lifting assembly being configured to selectively lift a gas can thereby facilitating the gas can to re-fuel a machine, set assembly comprising:
- a cart being configured to be rolled along a support surface, said cart comprising: a plurality of intersecting members, each of said intersecting members having a top side and bottom side;
- a plurality of wheels, each of said wheels being rotatably coupled to said cart wherein each of said wheels is configured to roll along support surface, each of said wheels being positioned on said bottom side of a corresponding one of said intersecting members;
- a lift being coupled to said cart wherein said lift is configured to be manipulated, said lift comprising:
  - a first tower being coupled to and extending upwardly from said top side of an associated one of said intersecting members, said first tower having a distal end with respect to said top side,
  - a second tower being coupled to and extending upwardly from said top side of an associated one of said intersecting members, said second tower having a distal end with respect to said top side, said first tower being spaced from said second tower,
  - a winch being coupled to said first tower wherein said winch is configured to be selectively rotated, said winch being vertically spaced above said cart,
  - a first pulley being rotatably coupled to said cart, said first pulley being positioned between said first and second towers,
  - a second pulley being rotatably coupled to said second tower, said second pulley being positioned on said distal end of said second tower, and
  - a cable being coupled around said winch, said cable extending through each of said first and second pulleys, said cable having a distal end with respect to said winch, said distal end being selectively urged upwardly and downwardly along said second tower when said winch is manipulated,
  - a roller being slidably coupled to said second tower, said distal end of said cable being coupled to said roller such that said roller is selectively raised and lowered along said second tower when said winch is manipulated, and
  - a pair of arms, each of said arms being coupled to and extending away from said roller, said arms being spaced apart from each other, each of said arms being horizontally oriented;
- a basket being slidably coupled to said second tower, said basket being coupled to said distal end of said cable such that said lift selectively lifts and lowers said basket, said basket being configured to have a gas can positioned therein thereby facilitating the gas can be selectively lifted and lowered for refueling a machine, said basket being pivotable relative to said lift wherein said cart is selectively positionable in a first position having said basket being horizontally oriented, said basket being selectively positionable in a second position having said basket being tilted wherein said basket is configured to pour gasoline from the gas can, said basket having a front side, a first lateral side and a second lateral side;
- a pair of biasing members, each of said biasing members being coupled between an associated one of said arms of said lift and an associated one of said first and second lateral sides of said basket, each of said biasing members urging said basket between said first and second positions; and
- a latch being hingedly coupled to said basket wherein said latch is configured to retain the gas can on said basket, said latch being positioned on said front side of said basket.

* * * * *